United States Patent

[11] 3,615,947

[72] Inventor Eiichi Yamada
Kodaira-shi, Japan

[21] Appl. No. 689,941
[22] Filed Dec. 12, 1967
[45] Patented Oct. 26, 1971
[73] Assignee Hitachi, Ltd.
Tokyo, Japan
[32] Priority Dec. 16, 1966
[33] Japan
[31] 41/82092

[54] METHOD OF SELECTIVE ETCHING

6 Claims, 20 Drawing Figs.

[52] U.S. Cl. .......... 156/3, 156/11, 156/17
[51] Int. Cl. .......... B32b 31/26, C23f 1/02
[50] Field of Search .......... 117/210, 212, 211, 213, ; 156/3, 8, 11, 17; 317/235; 204/15

[56] References Cited
UNITED STATES PATENTS

| | | | |
|---|---|---|---|
| 2,859,131 | 11/1958 | Watkins et al. | 117/211 |
| 3,035,990 | 5/1962 | Davis et al. | 156/11 X |
| 3,210,214 | 10/1965 | Smith | 156/8 X |
| 3,165,430 | 1/1965 | Hugle | 156/17 UX |
| 3,368,919 | 2/1968 | Casale et al. | 117/212 X |
| 3,432,405 | 3/1969 | Pilling et al. | 204/32 X |
| 3,438,873 | 4/1969 | Schmidt | 156/17 X |

*Primary Examiner*—William A. Powell
*Attorney*—Craig, Antonelli & Hill

ABSTRACT: A method of selective removal of a silicon nitride film covering the surface of a semiconductor substrate. A thin layer of aluminum, titanium or chromium is partially formed on the silicon nitride film in accordance with a geometrical pattern. The thin layer is oxidized to become etching-proof. Thereafter the film is dipped in a hydrofluoric acid solution, whereby the exposed portion of the nitride film is selectively removed using the oxidized thin layer as a mask.

INVENTOR
EIICHI YAMADA

BY Craig & Antonelli
ATTORNEYS

INVENTOR

EIICHI YAMADA

BY Craig & Antonelli

METHOD OF SELECTIVE ETCHING

BACKGROUND OF THE INVENTION

Field of the Invention

This invention relates to a method of selectively etching a material, and more particularly to a method of selectively removing a portion of an insulating passivation film covering the surface of a semiconductor body.

Description of the Prior Art

In the manufacture of a semiconductor device a semiconductor oxide such as $SiO_2$ has been widely used as an insulating passivation film to stabilize the surface of a semiconductor substrate or as a diffusion mask. However, it is known that the use of $SiO_2$ as a passivation film is limited within particular usages and that its use as a diffusion mask is not effective against important materials, e.g. Ga and Zn. Recently it has been noted that $Si_3N_4$ (Silicon nitride) obtained by the reaction of $SiH_4$ and $NH_3$ can be used instead of $SiO_2$. The chemical stability and high melting point (1,900° C.) of $Si_3N_4$ is especially suitable for a diffusion mask. On the other hand, since there is no suitable etching solution for this excellent passivation material, it is difficult in the present situation to engrave it selectively by the photoetching technique. The $Si_3N_4$ material is slightly etched by a concentrated HF solution. However, when a photoresist mask used for a high precision etching of a minute portion is dipped in the concentrated HF solution for a long time, it is much damaged. Therefore, the selective etching of $Si_3N_4$ film having a thickness more than 1,000 A. is not achieved with high precision.

SUMMARY OF THE INVENTION

One object of this invention is to provide a novel method of selective treatment of material, particularly silicon nitride.

Another object of this invention is to perform a diffusion treatment with high accuracy by selectively removing a $Si_3N_4$ film formed on a semiconductor substrate in accordance with a predetermined pattern, thereby obtaining a highly efficient semiconductor device.

The gist of this invention is briefly to provide a method of etching an $Si_3N_4$ film selectively. Namely, a layer of such an oxide as $Al_2O_3$ having a geometrical pattern is coated over the silicon compound film which covers one principal surface of semiconductor substrate. The exposed portion of nitride film is subjected to an etchant, e.g. hydrofluoric acid (HF). The HF solution erodes the nitride film but not the oxide layer to be used as a mask. Thus, the $Si_3N_4$ film is selectively removed, as $Si_3N_4$ has a small etching resistance against the concentrated HF solution while $Al_2O_3$ has a large one.

According to a specific embodiment of this invention, a pattern of a metal layer, such as aluminum, which is easily oxidized is formed on the $Si_3N_4$ film covering the surface of the semiconductor substrate. The metal layer is converted to a metal oxide ($Al_2O_3$) layer by oxidation and becomes etching-proof. The exposed portion of $Si_3N_4$ film is subjected to an HF solution with the $Al_2O_3$ layer as a mask. Thus the $Si_3N_4$ film is selectively etched in a simple manner.

According to another embodiment of this invention, the $Al_2O_3$ layer is obtained by thermal deposition of aluminum organic compound.

BRIEF DESCRIPTION OF THE DRAWINGS

FIG. 3 shows cross-sectional views of a semiconductor wafer in continuous processes according to still another embodiment of this invention.

DESCRIPTION OF THE PREFERRED EMBODIMENTS

Figure 1A:
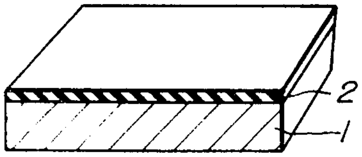
FIGS. 1*a* through 1*i* show perspective views of a material in each process of the selective treatment according to one embodiment of this invention.
Figure 1B:
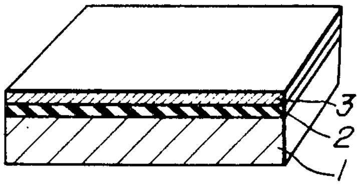
Figure 1C:
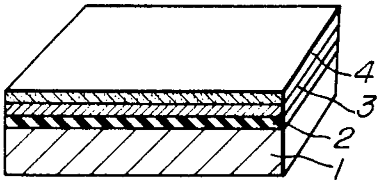
Figure 1D:
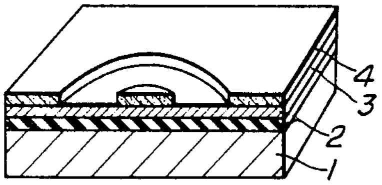
Figure 1E:
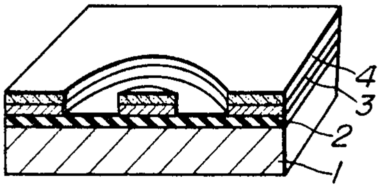
Figure 1F:
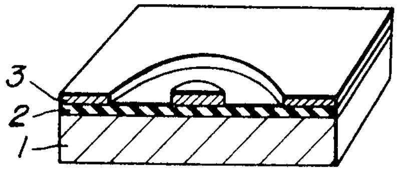
Figure 1G:
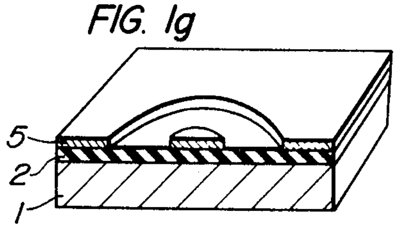
Figure 1H:
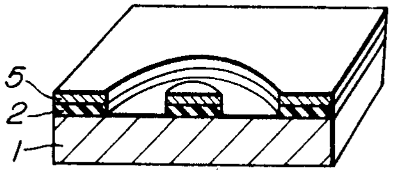
Figure 1I:
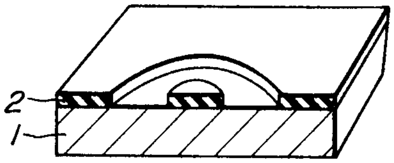

Hereinafter explanations will be made of preferred embodiments of this invention with reference to accompanying drawings.

FIGS. 1*a* through 1*i* show the first embodiment of this invention. The manufacturing processes are as follows.

a. The numeral 1 designates a semiconductor substrate of monocrystalline silicon. The numeral 2 designates an $Si_3N_4$ film of 5,000 A. thickness formed on the whole surface of substrate 1, as obtained by the reaction of $SIH_4$ and $NH_3$ at a temperature between 800° and 900° C. in $H_2$ atmosphere.

b. Aluminum is deposited on the whole surface of $Si_3N_4$ film to form an aluminum layer 3 of a thickness of from 1,000 to 6,000 A.

c. A photoresist film 4, e.g. a conventional KMER (commercial name), is applied on the A1 layer.

d. The photoresist film 4 is exposed to light through a photostencil having a desired pattern. The film is developed and the nonsensitized portion is removed.

e. The exposed portion of Al layer is removed by electrolytic or chemical etching using a dilute acid, e.g. $HNO_3$, HCl, $H_2SO_4$, $CH_3COOH$, and $H_3PO_4$.

f. The photoresist film 4 is removed with xylene, toluene, or trichlene. This step is performed at about 600° C. and may be included in the next step.

g. The aluminum layer 3 is oxidized at a suitable temperature of about 600° C. in an oxidizing atmosphere and converted to an $Al_2O_3$ layer 5. The whole aluminum layer can be oxidized if subjected to a high temperature of about 1,000° C. for a long time. However, since this often causes cracks, it is preferable to oxidize only the surface portion of aluminum layer in order to obviate the destruction due to a thermal stress.

h. The exposed portion of $Si_3N_4$ film 2 is removed by a concentrated HF solution (40 to 50% hydrogen fluoride solution) with the $Al_2O_3$ layer as a mask. Thus the surface of the substrate 1 is partially exposed.

i. The $Al_2O_3$ layer 5 is dipped in $H_2SO_4$ solution and removed. This process is not always necessary. When the $Al_2O_3$ layer is left and used as a part of passivation film, the reliability and electrical characteristics of device were found to be improved.

Figures 2A, 2B, 2C, 2D, 2E, 2F, 2G, 2H, 3A, 3B, 3C:
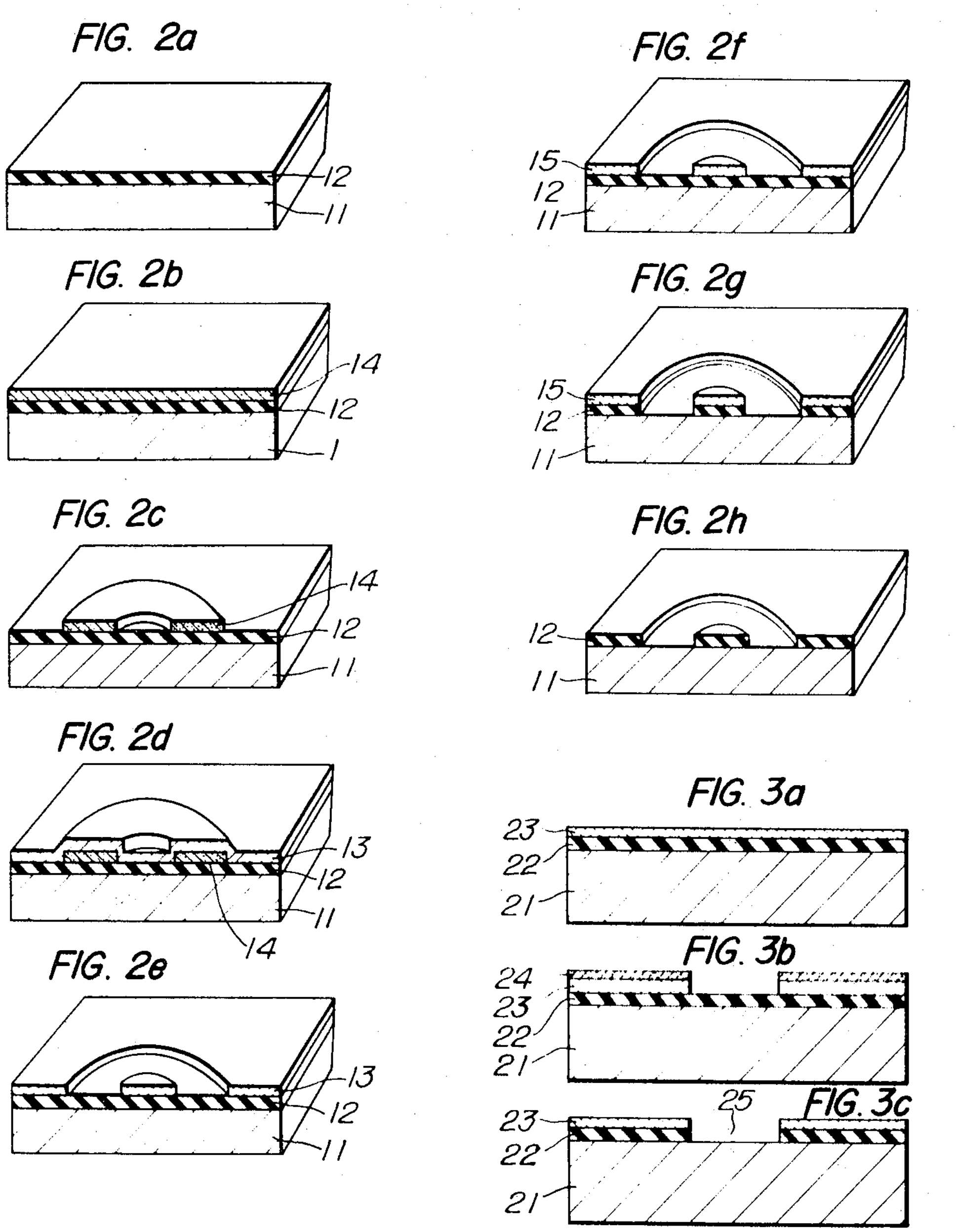
FIGS. 2*a* through 2*h* show perspective views of a material in each process of the selective treatment according to another embodiment of this invention.

FIGS. 2*a* through 2*h* show the second embodiment of this invention, the processes of which are as follows.

a. An $Si_3N_4$ film 12 is formed on an Si substrate 11.

b. A photoresist film 14 is applied on the surface of $Si_3N_4$ film by a conventional method.

c. The photoresist film 14 is exposed to light, using a pattern in which the portions passing and intercepting the light are in inverse relation with those of a pattern used in FIG. 1. The film is developed and removed partially as shown in FIG. 2*c*.

d. Aluminum is deposited on the whole surface of $Si_3N_4$ film 12 and photoresist film 14, forming an aluminum layer 13.

e. The photoresist film 14 and a portion of aluminum layer 13 thereon are removed by a mechanical force, ex. scraping.

f. The aluminum layer 13 is heated at about 600° C. to be oxidized and converted to an $Al_2O_3$ layer 15.

g. The nitride film 12 whose surface is selectively masked is dipped in HF solution, removing its exposed portion. Thus the surface of substrate 11 is exposed in a desired fashion.

h. The $Al_2O_3$ layer is removed by softly scraping it with cloth or cotton, or by dipping it in $H_2SO_4$ solution.

As described before, in the process of oxidizing the aluminum layer 3 or 13, cracks of the aluminum layer were often observed due to a mechanical strain by the high temperature. Although some improvements are needed in this respect, it is to be noted that above methods are relatively simple and practical.

Next, explanations will be made of etching methods according to another embodiment of this invention, in which the $Al_2O_3$ mask layer is free from the undesirable cracks.

The following embodiment is a modification of above-mentioned embodiments, characterized in that the oxidation of aluminum layer is divided into two stages. In the first stage the aluminum layer 3 or 13 was oxidized at 500° C. in an oxidizing atmosphere. In the second stage the layer was further oxidized at a temperature equal to or a little higher than 600° C. in an oxidizing atmosphere. The oxidizing atmospheres were obtained by introducing oxygen gas into a furnace maintained at 500° and 600° C. respectively. The treatment of each stage was performed for 30 minutes. The generation of cracks could be considerably prevented.

In another embodiment as shown in FIG. 3, there was no crack accident. An $Si_3N_4$ film was deposited on a silicon monocrystalline substrate 21 by the reaction of $SiH_4$ and $NH_3$ from vapor phase, as shown in FIG. 3*a*. An alumina layer ($Al_2O_3$) 23 of about 5,000 A. thickness was formed on the film 22 by the chemical deposition from vapor phase. This treatment was done 3 that triethoxyaluminium gas was introduced photoresist nitrogen as a carrier gas into a furnace maintained at about 420° C. and thermally decomposed. In another case, this treatment was done such that an aluminum organic compound such as triethoxyaluminium gas was introduced into a furnace at a pressure between $10^{12}$and $10^{11}$ mmHg and at about 400° C. and thermally decomposed. Trimethoxyaluminium, trimethylaluminium, and triethylaluminium may be used in place of triethoxyaluminium. A photoresist film 24 was selectively applied on a desired portion of $Al_2O_3$ layer 23 using the conventional photoresist treatment. The $Al_2O_3$ layer was perforated by HCl, $HNO_3$, $ChH_3COOH$, or $H_3PO_4$ with the photoresist film as a mask as shown in FIG. 3*b*. The remaining portion of $Al_2O_3$ layer was heated at 600°, 800°, 1,000°, or 1,200° C. to be converted from amorphous state to crystal state, i.e. $\delta$-$Al_2O_3$ and $\alpha$-$Al_2O_3$. By this heat treatment the $Al_2O_3$ layer became chemically resistant to the above four kinds of acid and HF. In the final process as shown in FIG. 3*c*, a hole 25 was formed in the $Si_3N_4$ film 22 with the $Al_2O_3$ layer 23 as a mask, exposing the surface of substrate 21. Thus, arbitrary treatments such as diffusion, etching, and epitaxial growth could be performed on the exposed surface.

In the above embodiments, since $Al_2O_3$ mask maintained a perfect pattern against HF solution, the selective removal of $Si_3N_4$ film could be accomplished with a high precision.

The present method simply has made possible the selective etching technique for $Si_3N_4$ film that has not been established heretofore by combining the deposition and the photoresist techniques. The inventive selective etching technique for $Si_3N_4$ film is very effective if applied to the formation of a diffusion mask and an electrode in manufacturing a semiconductor device.

Although above embodiments used $Al_2O_3$ mask against HF solution, other metal oxides such as $TiO_2$ and $Cr_2O_3$ are applicable.

In the case of $TiO_2$, the method is as follows. Titanium is deposited on an $Si_3N_4$ film by the vacuum evaporation method and etched by dilute acid (HCl, $HNO_3$, $ChH_3COOH$ etc.) in accordance with a pattern using a suitable photoresist film as a mask. The titanium layer is thereafter oxidized between 800° and 1,300° C. in an oxidizing atmosphere and becomes resistant to HF. After the oxidation treatment the titanium layer contains $TiO_2$ and becomes a resist film against HF. The $TiO_2$ layer thus obtained is as useful as the $Al_2O_3$ layer for a resist film in the selective treatment of $Si_3N_4$ film.

In the case case of $CrO_2$, chromium is first deposited on an $Si_3N_4$ film using vacuum evaporation. The etching treatment is performed by using aqua regia, or yellow prussiate of potash plus KOH solution. After the chrominium layer is etched in accordance with a suitable geometrical pattern, it is oxidized between 800° and 1,300° C. and converted to $CrO_2$, which can be used as a mask equivalently to $Al_2O_3$ and $TiO_2$ in the selective etching of $Si_3N_4$ film by HF solution.

Although explanations have been made of particular embodiments of this invention, it is apparent to those skilled in art that various modifications and alterations may be made without departing from the scope of appended claims.

I claim:

1. A method of selectively etching a material containing a silicon nitride film comprising the steps of: preparing a layer of aluminum on a portion of the surface of said material, the material being exposed partially in accordance with a geometrical pattern; heating the combination thus obtained in an oxidizing atmosphere at a temperature in the range of about 500° C. to 600° C. so as to oxidize at least the surface of said layer of aluminum; then subjecting the exposed portion of said material to an etchant containing hydrofluoric acid as the major ingredient, against which said layer and said material have a high and low etching resistance, respectively, thereby etching said material selectively in accordance with said Pattern.

2. A method of manufacturing a silicon semiconductor device comprising the steps of a. preparing a silicon substrate whose one principal surface is covered with a silicon nitride film,
b. depositing an aluminum layer on said film,
c. forming on said aluminum layer a photoresist layer having a desired geometrical pattern,
d. engraving said aluminum layer in accordance with said pattern with said photoresist layer as a mask,
e. heating the surface of said aluminum layer thus engraved in an oxidizing atmosphere at a temperature in the range of about 500° C. to 600° C. thereby to make the surface etching-proof, and
f. subjecting the exposed portion of said nitride film not covered with the etching-proof aluminum oxide layer to a solution whose major ingredient is hydrofluoric acid, thereby forming in said exposed portion a hole and exposing the semiconductor substrate there-through.

3. The method according to claim 2 wherein in step (e) the aluminum layer is first heated at about 500° C. and then at about 600° C.

4. A method of manufacturing a semiconductor device comprising the steps of covering a surface of a semiconductor substrate with a silicon nitride film; forming a photoresist layer having a desired geometrical pattern on said silicon nitride film; depositing a layer of a metal selected from the group consisting of aluminum, titanium and chromium on the surface of said silicon nitride film and said photoresist layer; removing said photoresist layer and the layer of said metal deposited on the silicon nitride film substantially intact; heating the combination thus obtained in an oxidizing atmosphere at a temperature in the range of 500° C. to 1,300° C. to oxidize at least the surface of said layer of a metal; and subjecting the exposed portion of said nitride film to a solution the major ingredient of which is hydrofluoric acid.

5. A method of manufacturing a semiconductor device comprising the steps of depositing a layer of aluminum oxide on a silicon nitride film by thermally decomposing an aluminum organic compound at about 400° C.; removing a selective portion of said layer of aluminum oxide; heating the remaining layer of aluminum oxide at a temperature of at least about 600° C.; then subjecting the exposed portion of said nitride film to a solution the major ingredient of which is hydrofluoric acid.

6. A method of selectively etching a material containing a silicon nitride film comprising the steps of preparing a layer of metal selected from the group consisting of titanium and chromium on a portion of the surface of said material, the material being exposed partially in accordance with a geometric pattern; heating the combination thus obtained in an oxidizing atmosphere at a temperature in the range of 800° C. to 1,300° C. so as to oxidize at least the surface part of said layer of the metal; then subjecting the exposed portion of said material to an etchant containing hydrofluoric acid as the major ingredient, against which said layer and said material have a high and a low etching resistance, respectively, and etching said material selectively in accordance with said pattern.

* * * * *